US011291235B2

(12) United States Patent
Delattre et al.

(10) Patent No.: US 11,291,235 B2
(45) Date of Patent: Apr. 5, 2022

(54) PHLORETIN

(71) Applicant: Firmenich SA, Geneva (CH)

(72) Inventors: Maxime Delattre, Geneva (CH); Jean-Luc Gelin, Geneva (CH); Long In Lou, Plainsboro, NJ (US); Ronald H. Skiff, Plainsboro, NJ (US)

(73) Assignee: Firmenich SA, Satigny (CH)

( * ) Notice: Subject to any disclaimer, the term of this patent is extended or adjusted under 35 U.S.C. 154(b) by 0 days.

(21) Appl. No.: 16/066,059

(22) PCT Filed: Jan. 19, 2017

(86) PCT No.: PCT/EP2017/051124
§ 371 (c)(1),
(2) Date: Jun. 25, 2018

(87) PCT Pub. No.: WO2017/125518
PCT Pub. Date: Jul. 27, 2017

(65) Prior Publication Data
US 2020/0375233 A1 Dec. 3, 2020

Related U.S. Application Data

(60) Provisional application No. 62/280,460, filed on Jan. 19, 2016.

(51) Int. Cl.
A23L 27/00 (2016.01)
A23L 29/00 (2016.01)

(52) U.S. Cl.
CPC .............. A23L 27/88 (2016.08); A23L 27/84 (2016.08); A23L 29/035 (2016.08)

(58) Field of Classification Search
CPC ......... A23L 27/88; A23L 29/035; A23L 27/84
USPC ....................................... 426/534
See application file for complete search history.

(56) References Cited

U.S. PATENT DOCUMENTS

| 2008/0227867 A1 | 9/2008 | Ley et al. |
| 2008/0312923 A1 | 12/2008 | Ley et al. |
| 2010/0233102 A1 | 9/2010 | Krammer et al. |
| 2010/0292175 A1 | 11/2010 | Wessjohann et al. |

(Continued)

FOREIGN PATENT DOCUMENTS

JP          H10-276712 A    10/1998

OTHER PUBLICATIONS

International Search Report and Written Opinion for International Application PCT/EP2017/051124, dated Apr. 13, 2017.

(Continued)

Primary Examiner — Brent T O'Hern
(74) Attorney, Agent, or Firm — Robert S. Dailey

(57) ABSTRACT

Provided herein is a method of reducing the off-taste of a food or beverage wherein the off-taste is selected from the group consisting of licorice, astringency, bitterness and sweet lingering comprising adding about 10 to about 40 ppm, phloretin to the food or beverage wherein the phloretin is provided in the substantial absence of a bitterness-masking aroma substance selected from the groups consisting of homoeriodictylol, homoeriodictyol sodium salt, homoeriodictylol potassium salt or mixtures thereof and wherein the phloretin does not significantly enhance the sweetness of the article or composition.

6 Claims, 5 Drawing Sheets

(56) References Cited

U.S. PATENT DOCUMENTS

2011/0189108 A1* 8/2011 Backes ................. A23L 27/30
424/49
2012/0322750 A1 12/2012 Schrader et al.
2013/0216692 A1 8/2013 Sabater et al.
2013/0316060 A1* 11/2013 Walton ..................... A23L 2/56
426/538

OTHER PUBLICATIONS

Lindley et al., J. Food Sci., vol. 58, pp. 592-594 (1993).
Tieman et al., Curr. Biol., vol. 22, pp. 1035-1039 (2012).
Ley et al., J. Ag. Food Chem., vol. 60, pp. 6303-6311 (2012).

* cited by examiner

PHLORETIN

This application is a 371 filing of International Patent Application PCT/EP2017/051124 filed 19 Jan. 2017, which claims the benefit of U.S. provisional patent application 62/280,460, filed 19 Jan. 2016, the contents of which are hereby incorporated by reference in their entirety.

FIELD

The inventions described herein have use in foods and beverages, particularly those that rely on sweeteners and other flavor components and more particularly those that might rely on compounds and ingredients found in nature.

BACKGROUND

Phloretin has been reported for use as a modulator of sweetness.

SUMMARY

Provided herein is a method of reducing the off-taste of a food or beverage wherein the off-taste is selected from the group consisting of licorice, astringency, bitterness and sweet lingering comprising adding about 10 to about 40 ppm, phloretin to a flavored article or flavoring composition wherein the article or composition is provided in the substantial absence of a bitterness-masking aroma substance selected from the groups consisting of homoeriodictylol, homoeriodictyol sodium salt, homoeriodictylol potassium salt or mixtures thereof and wherein the phloretin does not significantly enhance the sweetness of the article or composition.

Further provided herein is a method of reducing the off-taste of a food or beverage wherein the off-taste is selected from the group consisting of licorice, astringency, bitterness and sweet lingering comprising adding about 10 to about 40 ppm, phloretin to a food or beverage wherein the food or beverage is provided in the substantial absence of a bitterness-masking aroma substance selected from the groups consisting of homoeriodictylol, homoeriodictyol sodium salt, homoeriodictylol potassium salt or mixtures thereof and wherein the phloretin does not significantly enhance the sweetness of the food or beverage.

Further provided herein is the use of phloretin (also known as 3-(4-hydroxyphenyl)-1-(2,4,6-trihydroxyphenyl)propan-1-one) as a taste modulator; more specifically, as a masker of off-notes associated with high potency sweeteners such as steviol glycosides and rebaudiosides, Further provided herein is the use of phloretin as a flavor modifier.

DETAILED DESCRIPTION

Figure 1:
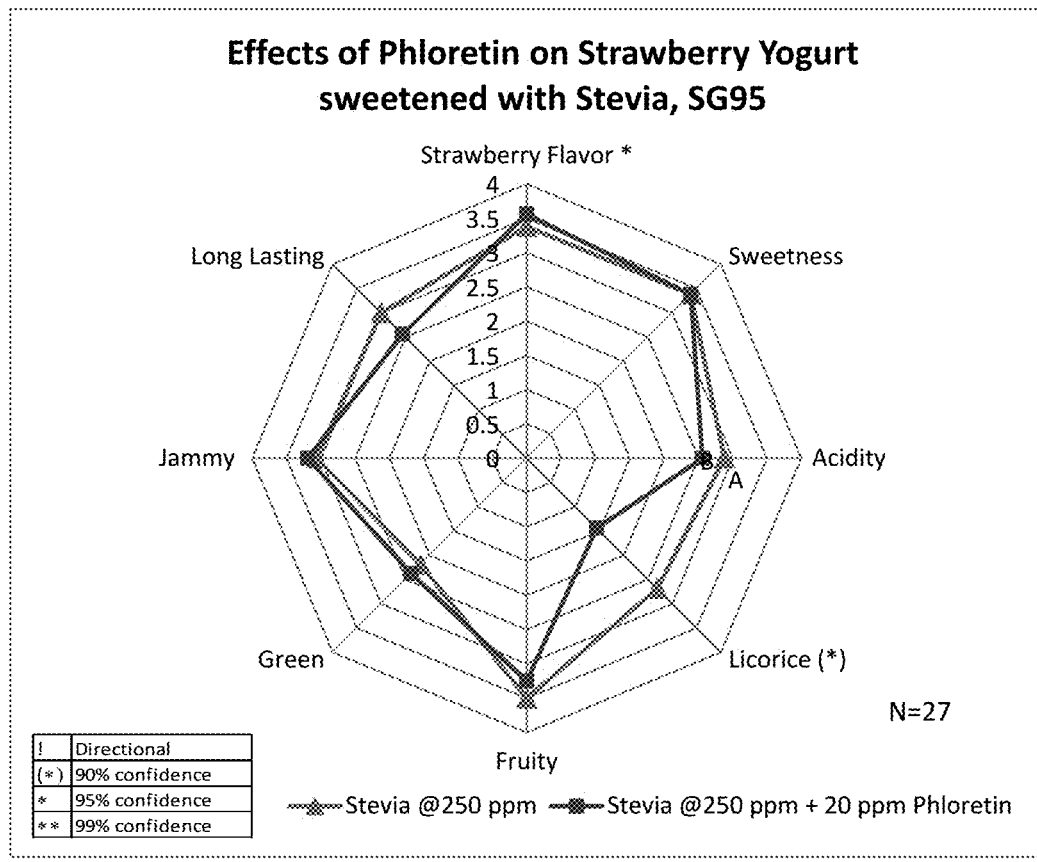
FIG. 1 shows the effect of Phloretin on Strawberry Yogurt sweetened with Stevia, in particular, a natural, high purity combination of nine sweet steviol glycosides found within the stevia leaf. Reb A accounts for over half of the final composition ("SG95").

For the descriptions herein and the appended claims, the use of "or" means "and/or" unless stated otherwise. Similarly, "comprise," "comprises," "comprising" "include," "includes," and "including" are interchangeable and not intended to be limiting.

It is to be further understood that where descriptions of various embodiments use the term "comprising," those skilled in the art would understand that in some specific instances, an embodiment can be alternatively described using language "consisting essentially of" or "consisting of."

In one embodiment, Phloretin is provided in a food or beverage in an amount of about 15 ppm to about 35 ppm, more particularly from about 20 ppm to about 30 ppm, even more particularly at about 20 ppm by weight of the total weight of the food or beverage.

In one embodiment, Phloretin modifies the off-note perception of food and beverages that contain a natural sweetener for example, but not limited to stevia extracts and luo han guo extracts.

In one embodiment, Phloretin modifies sensory traits, for example by decreasing the off-note perception of natural, high intensity sweeteners as well as masking other negative flavor properties such as bitterness, licorice, and/or sourness.

It has been discovered that Phloretin, when tasted in water or in a model beverage solution of water and citric acid contains (for the most part) nearly no flavor on its own. However, when used as a taste modifier in foods and beverages containing steviol glycosides and rebaudioside, phloretin provides off-note masking abilities such as reduced linger, reduced licorice and reduced bitterness.

Higher levels of phloretin do not appear to bring much additional taste modification benefits and at the same time, higher levels may be even less effective in masking the bitterness or lingering licorice, and off-notes associated with some high potency sweeteners.

In on embodiment, phloretin is provided in an amount sufficient to confer, enhance, improve or modify the flavor or aroma of a food or beverage.

In one embodiment, the sweetener provided herein is selected from the group consisting common saccharide sweeteners, e.g., sucrose, fructose (e.g., D-fructose),glucose (e.g., D-glucose); sweetener compositions comprising natural sugars, such as corn syrup (including high fructose corn syrup) or other syrups or sweetener concentrates derived from natural fruit and vegetable sources; semisynthetic "sugar alcohol" sweeteners such as erythritol, isomalt, lactitol, mannitol, sorbitol, xylitol, maltodextrin, glycerol, threitol, arabitol, ribitol, and dulcitol; artificial sweeteners such as miraculin, aspartame, superaspartame, saccharin, saccharin-sodium salt, acesulfame-K, cyclamate, sodium cyclamate, and alitame; other sweeteners such as trehalose, melizitose, melibiose, raffinose, palatinose, lactulose, cyclamic acid, mogroside, tagatose (e.g., D-tagatose), maltose, galactose (e.g., D-galactose), L-rhamnose, D-sorbose, maunose (e.g., D-maunose), lactose, L-arabinose,D-ribose, D-glyceraldehyde, curculin, brazzein, mogroside, Neohesperidin dihydrochalcone (NHDC), neotame and other aspartame derivatives, D-tryptophan, D-leucine, D-threonine, glycine, D-asparagine, D-phenylalanine, L-proline, maltitol, hydrogenated glucose syrup (HGS), magap, sucralose, lugduname, sucrononate, sucrooctate, monatin, phyllodulcin, hydrogenated starch hydrolyzate (HSH), stevioside, rebaudioside A, rebaudioside D, rebadioside M, and other sweet Stevia based glycosides, lo han guo, thaumatin, monellin, carrelameand amd other guanidine-based sweeteners. Particularly, the sweetener is a high potency sweetener, particularly it is selected from the group consisting of saccharin, aspartame, cyclamate, sucralose, saccharine, stevia, rebauasdioside A, neotame, acesulfame K, sucrose, glucose fructose and sorbitol, more particularly it is selected from the group consisting of fructose and stevia.

In a further embodiment the sweetener is selected from the group consisting of sucrose, fructose, and stevia. In a further embodiment, the sweetener comprises a purified stevia extract having a high purity combination of nine sweet steviol glycosides found within the stevia leaf. The purified stevia extract may be represented by high purity combination of nine sweet steviol glycosides found within the stevia leaf wherein Reb A accounts for over half of the final composition (e.g., SG95 sold by PureCircle).

Optional ingredients include sucrose, HFCS, steviol glycosides, rebaudiosides, Luo han guo, other high potency sweeteners, and any combination thereof in the presence of phloretin at 10-50 ppm.

Highly astringent foods and beverages or other products that may be candidates where phloretin may be applied to reduce that flavor characteristic.

In one embodiment, provided herein is:
i) a flavor comprising Phloretin as described herein and
ii) a foodstuff base.

For the sake of clarity, it has to be mentioned that, by "foodstuff" we mean here an edible product, e.g. a food or a beverage. Therefore, a flavored article according to the invention comprises 1-Ethoxyethyl acetate, as well as optional benefit agents, corresponding to a flavor or aroma and flavor or aroma profile of the desired edible product. The compositions and methods provided herein have use in food or beverage products. When the food product is a particulate or powdery food, the dry particles may easily be added thereto by dry-mixing. Typical food products are selected from the group consisting of an instant soup or sauce, a breakfast cereal, a powdered milk, a baby food, a powdered drink, a powdered chocolate drink, a spread, a powdered cereal drink, a chewing gum, an effervescent tablet, a cereal bar, and a chocolate bar. The powdered foods or drinks may be intended to be consumed after reconstitution of the product with water, milk and/or a juice, or another aqueous liquid.

Suitable foodstuff bases, e.g. foods or beverages, include dairy and confectionary products where a fresh or fruity tonality is desired.

In another embodiment provided herein is a fluid dairy product including without limitation, non-frozen, partially frozen and frozen fluid dairy products such as, for example, milks, ice creams, sorbets and yogurts.

Beverage products include, without limitation, carbonated soft drinks, including cola, lemon-lime, root beer, heavy citrus ("dew type"), fruit flavored and cream sodas; powdered soft drinks, as well as liquid concentrates such as fountain syrups and cordials; coffee and coffee-based drinks, coffee substitutes and cereal-based beverages; teas, including dry mix products as well as ready-to-drink teas (herbal and tealeaf based); fruit and vegetable juices and juice flavored beverages as well as juice drinks, nectars, concentrates, punches and "ades"; sweetened and flavored waters, both carbonated and still; sport/energy/health drinks; alcoholic beverages plus alcohol-free and other low-alcohol products including beer and malt beverages, cider, and wines (still, sparkling, fortified wines and wine coolers); other beverages processed with heating (infusions, pasteurization, ultra high temperature, ohmic heating or commercial aseptic sterilization) and hot-filled packaging; and cold-filled products made through filtration or other preservation techniques. The nature and type of the constituents of the foodstuffs or beverages do not warrant a more detailed description here, the skilled person being able to select them on the basis of his general knowledge and according to the nature of said product.

The compositions and methods provided herein have use in food or beverage products. When the food product is a particulate or powdery food, the dry particles may easily be added thereto by dry-mixing. Typical food products are selected from the group consisting of an instant soup or sauce, a breakfast cereal, a powdered milk, a baby food, a powdered drink, a powdered chocolate drink, a spread, a powdered cereal drink, a chewing gum, an effervescent tablet, a cereal bar, and a chocolate bar. The powdered foods or drinks may be intended to be consumed after reconstitution of the product with water, milk and/or a juice, or another aqueous liquid.

The food product may be selected from the group consisting of condiments, baked goods, powdery food, bakery filings and Fluid dairy products.

Condiments include, without limitation, ketchup, mayonnaise, salad dressing, Worcestershire sauce, fruit-flavored sauce, chocolate sauce, tomato sauce, chili sauce, and mustard.

Baked goods include, without limitation, cakes, cookies, pastries, breads, donuts and the like.

Bakery fillings include, without limitation, low or neutral pH fillings, high, medium or low solids fillings, fruit or milk based (pudding type or mousse type) fillings, hot or cold make-up fillings and nonfat to full-fat fillings.

Fluid dairy products include, without limitation, non-frozen, partially frozen and frozen fluid dairy products such as, for example, milks, ice creams, sorbets and yogurts.

Beverage products include, without limitation, carbonated soft drinks, including cola, lemon-lime, root beer, heavy citrus ("dew type"), fruit flavored and cream sodas; powdered soft drinks, as well as liquid concentrates such as fountain syrups and cordials; coffee and coffee-based drinks, coffee substitutes and cereal-based beverages; teas, including dry mix products as well as ready-to-drink teas (herbal and tealeaf based); fruit and vegetable juices and juice flavored beverages as well as juice drinks, nectars, concentrates, punches and "ades"; sweetened and flavored waters, both carbonated and still; sport/energy/health drinks; alcoholic beverages plus alcohol-free and other low-alcohol products including beer and malt beverages, cider, and wines (still, sparkling, fortified wines and wine coolers); other beverages processed with heating (infusions, pasteurization, ultra high temperature, ohmic heating or commercial aseptic sterilization) and hot-filled packaging; and cold-filled products made through filtration or other preservation techniques. SG95 is a natural, high purity combination of nine sweet steviol glycosides found within the stevia leaf. Reb A accounts for over half of the final composition.

The nature and type of the flavoring co-ingredients present in the base do not warrant a more detailed description here, the skilled person being able to select them on the basis of his/her general knowledge and according to intended use or application and the desired organoleptic effect. In general terms, these flavoring co-ingredients belong to chemical classes as varied as alcohols, aldehydes, ketones, esters, ethers, acetates, nitriles, terpenoids, nitrogenous or sulphurous heterocyclic compounds and essential oils, and said perfuming co-ingredients can be of natural or synthetic origin. Many of these co-ingredients are in any case listed in reference texts such as the book by S. Arctander, Perfume and Flavor Chemicals, 1969, Montclair, N.J., USA, or its more recent versions, or in other works of a similar nature, as well as in the abundant patent literature in the field of flavor. It is also understood that said co-ingredients may also be compounds known to release in a controlled manner various types of flavoring compounds.

By "flavor carrier" we mean here a material which is substantially neutral from a flavor point of view, insofar as it does not significantly alter the organoleptic properties of flavoring ingredients. The carrier may be a liquid or a solid.

Suitable liquid carriers include, for instance, an emulsifying system, i.e. a solvent and a surfactant system, or a solvent commonly used in flavors. A detailed description of the nature and type of solvents commonly used in flavor cannot be exhaustive. Suitable solvents include, for instance, propylene glycol, triacetin, triethyl citrate, benzylic alcohol, ethanol, vegetable oils or terpenes.

Suitable solid carriers include, for instance, absorbing gums or polymers, or even encapsulating materials. Examples of such materials may comprise wall-forming and plasticizing materials, such as mono, di- or trisaccharides, natural or modified starches, hydrocolloids, cellulose derivatives, polyvinyl acetates, polyvinylalcohols, proteins or pectins, or yet the materials cited in reference texts such as H. Scherz, Hydrokolloids : Stabilisatoren, Dickungs-und Gehermittel in Lebensmittel, Band 2 der Schriftenreihe Lebensmittelchemie, Lebensmittelqualität, Behr's VerlagGmbH & Co., Hamburg, 1996. Encapsulation is a well known process to a person skilled in the art, and may be performed, for instance, using techniques such as spray-drying, agglomeration, extrusion, coacervation and the like.

In embodiment, the particular types of end products useful are: flavored waters, soft drinks, diet drinks, juice containing drinks, tea and coffee drinks, alcoholic drinks, neutraceutical drink preparations, medicinal drink formulations, beverage supplements and others foodstuffs such as dairy drinks, yogurts, cereals, condiments, puddings, gelatins, or any other foodstuffs sweetened with sugar, HFCS, or high potency sweeteners.

The below examples are illustrative only and are not meant to limit the claims or embodiments described herein.

EXAMPLES

Example 1

The addition of 20 ppm Phloretin to a strawberry Yogurt sample sweetened with 250 ppm Stevia was judged to be significantly lower in licorice taste and higher in Strawberry flavor intensity than the control product which was also sweetened with 250 ppm Stevia. See Table 1 and FIG. 1.

TABLE 1

| | Description Flavor | | |
|---|---|---|---|
| Control: Base "full Stevia" (0% sugar, 250 ppm Stevia (SG95)) Test: "full Stevia" + 20 ppm Phloretin | | | |
| Attribute n = 29 | Control Stevia @250 ppm | Test Stevia @250 ppm + 20 ppm Phloretin | P-Value |
| Strawberry Flavor * | 3.38 | 3.56 | 0.0398 |
| Sweetness | 3.38 | 3.38 | 0.5 |
| Acidity | 2.88 | 2.56 | 0.1753 |
| Licorice (*) | 2.69 | 1.44 | 0.0518 |

TABLE 1-continued

| | Description Flavor | | |
|---|---|---|---|
| Fruity | 3.5 | 3.25 | 0.1904 |
| Green | 2.19 | 2.38 | 0.3058 |
| Jammy | 3.06 | 3.19 | 0.3131 |
| Long Lasting | 3 | 2.56 | 0.1699 |

Example 2

Figure 2:
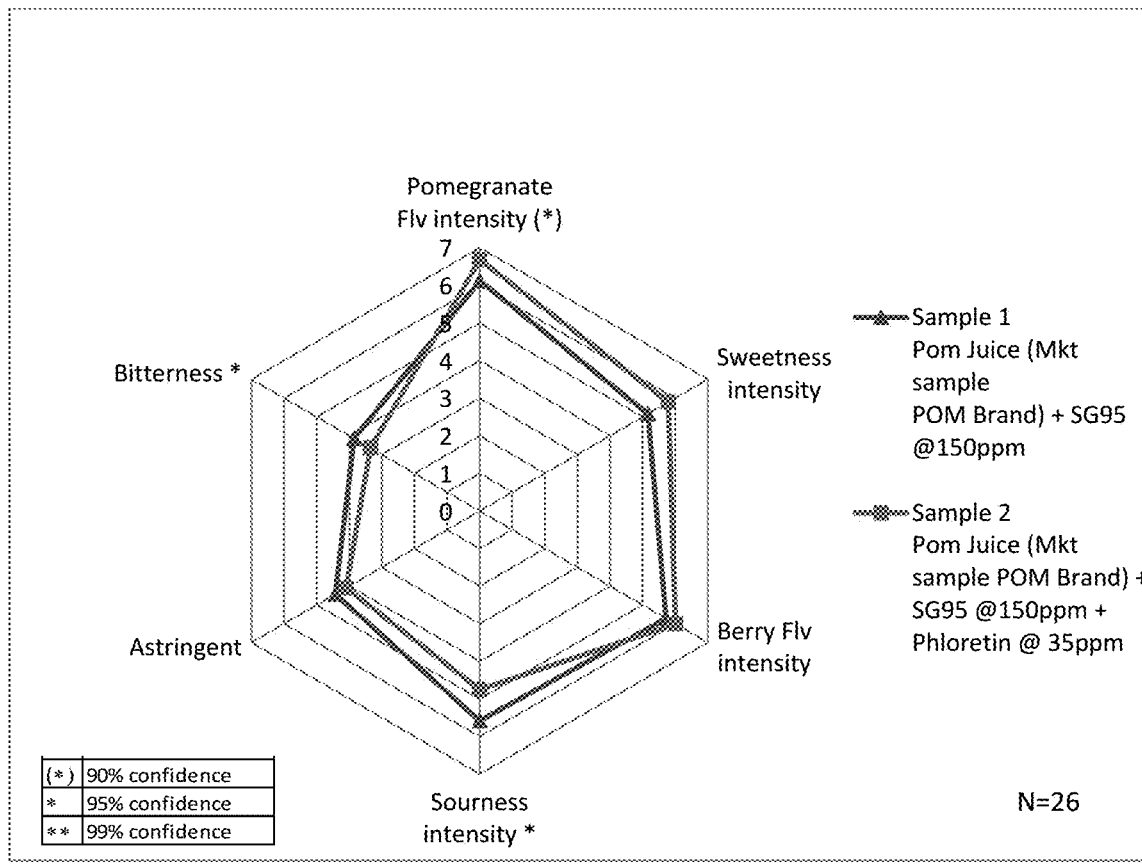
FIG. 2 shows the effect of 35 ppm Phloretin when added to Pomegranate Juice.

Adding 35 ppm Phloretin to a Pomegranate juice sweetened with 150 ppm Stevia, significantly reduces the Sourness and Bitterness Intensity, while significantly increasing the Pomegranate flavor intensity. See Table 2 and FIG. 2.

TABLE 2

| Pomegranate Juice with Phloretin sensory result | | | |
|---|---|---|---|
| Attribute | Sample 1 Pom Juice (Mkt sample POM Brand) + SG95 @150 ppm | Sample 2 Pom Juice (Mkt sample POM Brand) + SG95 @150 ppm + Phloretin @ 35 ppm | P-Value |
| Pomegranate Flv intensity (*) | 6.12 | 6.68 | 0.0977 |
| Sweetness intensity | 5.16 | 5.79 | 0.1244 |
| Berry Flv intensity | 5.72 | 6.01 | 0.4268 |
| Sourness intensity * | 5.58 | 4.75 | 0.0402 |
| Astringent | 4.43 | 4.1 | 0.2688 |
| Bitterness * | 3.85 | 3.35 | 0.0387 |

Example 3

Figure 3:
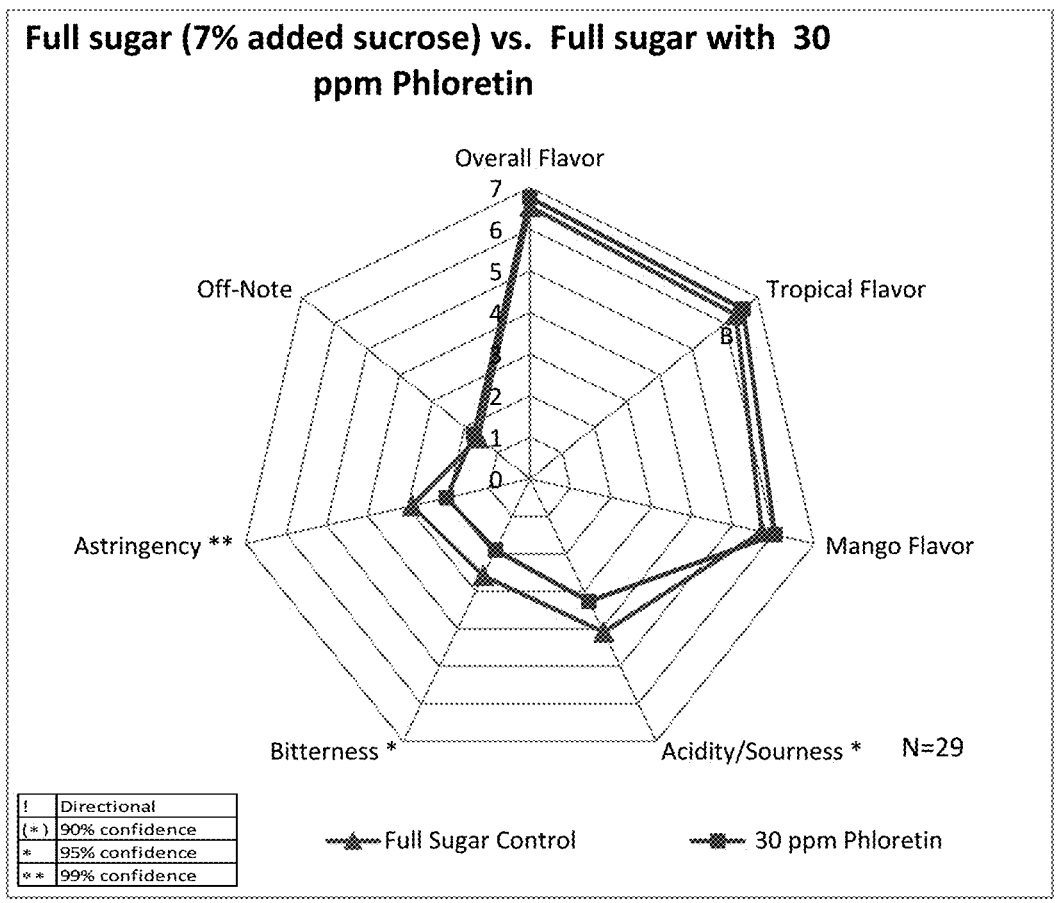
FIG. 3 shows the effect of 30 ppm Phloretin added to sucrose.

Adding 30 ppm Phloretin to a Tropical Flavored, sugar sweetened, soft drink containing 7% sucrose significantly reduced its acidity/sourness, bitterness and astringency. See Table 3 and FIG. 3.

TABLE 3

| | Description Flavor | | | | |
|---|---|---|---|---|---|
| Control: Base (7% sucrose) Test: 7% Sucrose + 30 ppm Phloretin | | | | | |
| Attribute Intensity | Sample 1 Full Sugar Control | | Sample 2 30 ppm Phloretin | | P-Value |
| Overall Flavor | 6.54 | | 6.76 | | 0.2892 |
| Tropical Flavor | 6.33 | | 6.55 | | 0.4635 |
| Mango Flavor | 5.72 | | 6.04 | | 0.2545 |
| Passion Fruit Flavor | 5.96 | | 5.69 | | 0.531 |
| Acidity/Sourness * | 4.09 | a | 3.27 | b | 0.022 |
| Bitterness * | 2.58 | a | 1.9 | b | 0.0316 |
| Astringency ** | 2.9 | a | 2.05 | b | 0.0069 |
| Off-Note | 1.58 | | 1.72 | | 0.6338 |

Example 4

Figure 4:
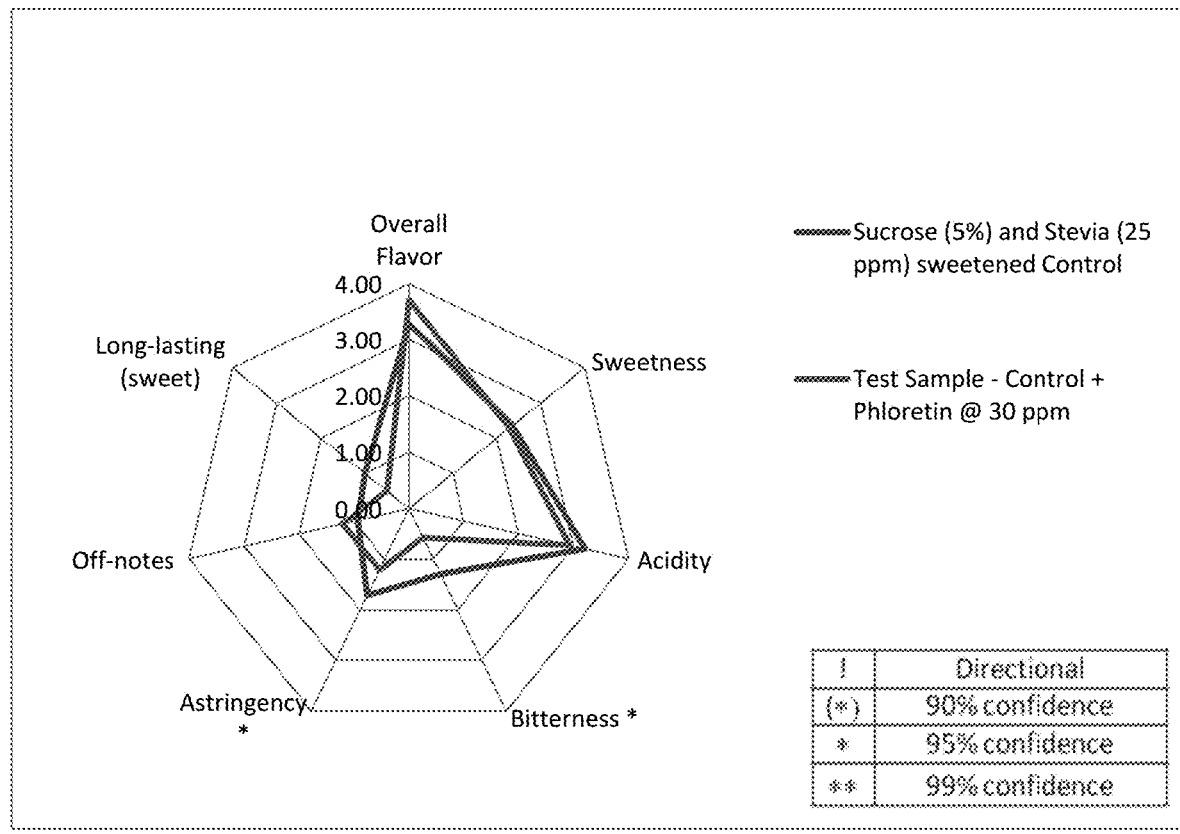
FIG. 4 shows the effect of Phloretin on the bitterness and astringency of a sucrose (5%) and stevia (SG95@25 ppm) sweetened tropical juice drink.

Adding 30 ppm Phloretin to a Tropical Juice Flavored, sugar (5%) and Stevia (25 ppm) sweetened, juice containing soft drink significantly reduced its bitterness and astringency. See Table 4 and FIG. 4.

| Base (Control) Recipe | |
|---|---|
| Sugar | 70.55 g |
| Citric Acid | 1.75 g |
| Ascorbic Acid | 0.15 g |
| Potassium Sorbate | 0.15 g |
| Tropical Compound 050002 JC20181 | 32.00 g |
| Water | 928.40 g |
| Total | 1032.86 g |

TABLE 4

| | Sucrose (5%) and Stevia (25 ppm) sweetened Control | Test Sample - Control + Phloretin @ 30 ppm | P-value |
|---|---|---|---|
| Overall Flavor | 3.29 | 3.71 | 0.2 |
| Sweetness | 2.36 | 2.29 | 0.846 |
| Acidity | 3.21 | 2.93 | 0.522 |
| Bitterness * | 1.29 | 0.57 | 0.047 |
| Astringency * | 1.71 | 1.21 | 0.038 |
| Off-notes | 0.93 | 1.21 | 0.356 |
| Long-lasting (sweet) | 1.00 | 0.50 | 0.134 |

Example 5

1-Objectives

To evaluate sensory effect of phloretin on pea protein solution

2-Approach

Evaluation in blind and randomized conditions of pasteurized sweet water solution of pea protein isolate
1. Control: no phloretin added
2. Test: 30 ppm phloretin added (via a presolution 10% in propylene glycol)

3-Formulations and Preparation 3.1 Formulation

TABLE 5

| Ingredient | Control (% by weight) | Test (% by wight) |
|---|---|---|
| Deionized water | 94 | 93.97 |
| Propulse S | 3 | 3 |
| Sugar | 3 | 3 |
| Phloretin (10% in Propylene glycol) | | 0.03 |
| Total | 100 | 100 |

(1) Propulse S: pea protein isolate: protein content 82.35%, fat <0.5%

3.2 Preparation

Weigh and premix protein with sugar (600 gram preparation)

Dispersion/solubilisation of protein-sugar-water to obtain a "mother mixture": disperse mix protein/sugar in water (becher—deionized water 40° C.—Mini Ultra-Turrax T18—Speed 2—time:7 minutes). The same "mother mixture" for both the Control and Test trials.

Add phloretin (fresh dilution 10% in propylene Glycol) in Test trial. Split each trials in 2 glass bottles: 100 g for pre-evaluation and generation of sensory attributes—200 gram for sensory assessment Pasteurisation (water bach—95° C.—30 minutes). Cooling bottles at room temperature—Storage in fridge until tasting. Perform Sensory assessment at room temperature.

4-Sensory Assessmement 4.1 Sensory Protocol

Figure 5:
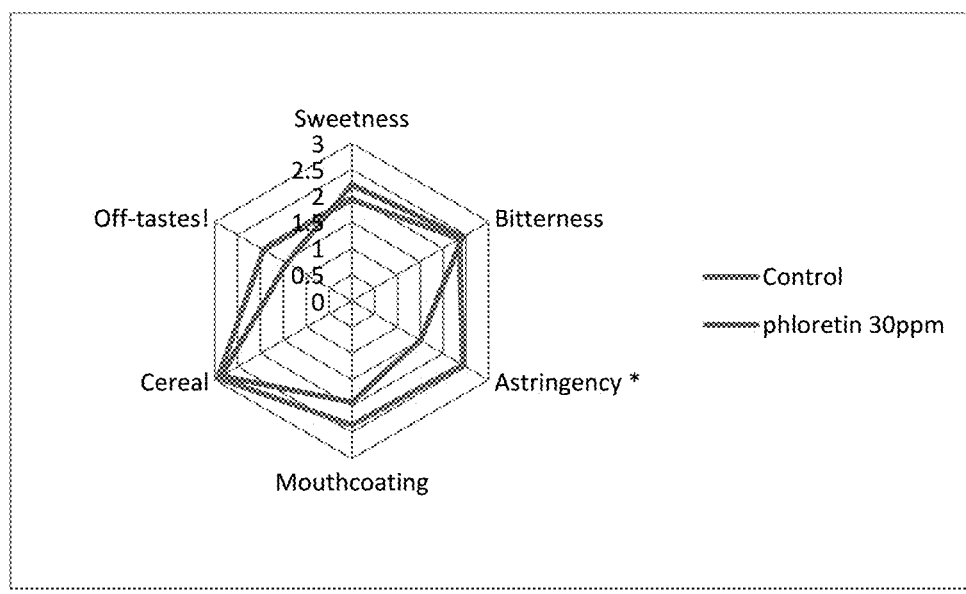
FIG. 5 shows the effect of Phloretin at 30 ppm on the astringency and off-tastes of a pea protein formulation.

Eight panelists were asked to rate intensity of sensory attributes using a 0 to 5 structured scale (from 0 'not perceptible' to 5 'strong intensity'). Sensory descriptors were selected to assess taste, tactile and aromatic stimuli Data treatment was run with XLSTAT software (Duncan mean comparison test). Sensory attributes were selected during a preliminary series of applications evaluated in a free-description mode Symbols for significant differences * at 95% (See FIG. 5).

Samples with same letter are not significantly different according to Duncan comparison test. Addition of phloretin (30 ppm as consumed via a pre-dilution 10% in propylene glycol) in Test trial was found to significantly reduce scores in "astringency" and "off-tastes". Other sensory attributes related to taste ("Sweetness", "Bitterness"), tactile (mouth-coating) or aromatic stimuli ("cereal") were unmodified. See FIG. 5.

What is claimed is:

1. A method of reducing a licorice off-taste of a food or beverage, the method comprising adding phloretin to a food or beverage at a concentration ranging from 10 ppm to 40 ppm by weight, based on the total weight of the food or beverage; wherein adding the phloretin to the food or beverage reduces a licorice off-taste of the food or beverage; and wherein the food or beverage product is absent of a bitterness-masking aroma substance selected from the group consisting of: homoeriodictylol, homoeriodictyol sodium salt, homoeriodictylol potassium salt and mixtures thereof.

2. The method of claim 1, comprising adding the phloretin to the food or beverage at a concentration ranging from 15 ppm to 35 ppm, based on the total weight of the food or beverage.

3. The method of claim 2, comprising adding the phloretin to the food or beverage at a concentration ranging from 20 to 30 ppm, based on the total weight of phloretin to the food or beverage.

4. The method of claim 1, wherein the food or beverage comprises sucrose or fructose.

5. The method of claim 1, wherein the food or beverage comprises steviol glycosides.

6. The method of claim 1, wherein the food or beverage comprises ascorbic acid or citric acid.

* * * * *